United States Patent
Nieberlein et al.

(10) Patent No.: US 9,370,062 B2
(45) Date of Patent: Jun. 14, 2016

(54) LED LIGHTING APPARATUS COMPRISING AN ENERGY STORAGE MODULE AND METHOD FOR OPERATING THE LED LIGHTING APPARATUS

(71) Applicant: Diehl Aerospace GmbH, Ueberlingen (DE)

(72) Inventors: Uwe Nieberlein, Roth (DE); Jens Jordan, Nuernberg (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 14/687,318

(22) Filed: Apr. 15, 2015

(65) Prior Publication Data
US 2015/0296578 A1     Oct. 15, 2015

(30) Foreign Application Priority Data
Apr. 15, 2014     (DE) .............................. 102014005584

(51) Int. Cl.
H05B 37/02     (2006.01)
H05B 33/08     (2006.01)

(52) U.S. Cl.
CPC ........ *H05B 33/0815* (2013.01); *H05B 33/0812* (2013.01); *H05B 37/02* (2013.01)

(58) Field of Classification Search
CPC ............................ H05B 33/0827; H05B 37/02
USPC ...................... 315/185 R, 192, 291, 307, 308
See application file for complete search history.

(56) References Cited

U.S. PATENT DOCUMENTS

| | | | | |
|---|---|---|---|---|
| 2012/0176826 A1* | 7/2012 | Lazar | .................... | H02M 3/158 363/126 |
| 2012/0262075 A1* | 10/2012 | Lynch | ................ | H05B 33/0818 315/192 |
| 2012/0286684 A1* | 11/2012 | Melanson | ........... | H02M 1/4225 315/224 |
| 2013/0257300 A1 | 10/2013 | Nieberlein et al. | | |
| 2014/0265885 A1* | 9/2014 | Hu | ........................ | H05B 33/083 315/186 |

(Continued)

FOREIGN PATENT DOCUMENTS

| | | |
|---|---|---|
| DE | 102011003931 A1 | 8/2012 |
| DE | 102012006315 A1 | 10/2013 |
| DE | 102012006316 A1 | 10/2013 |

(Continued)

OTHER PUBLICATIONS

English Abstract of WO 2012/107293 A2, dated Aug. 16, 2012.

*Primary Examiner* — Tung X Le
(74) *Attorney, Agent, or Firm* — Scully Scott Murphy and Presser

(57) ABSTRACT

An LED lighting apparatus is provided. The apparatus has an LED luminous unit having multiple plurality LEDs and a switching arrangement. The LED luminous unit has different forward voltages in different switching states. The apparatus also has a control device for driving the LED luminous unit and a current sink device in a normal operating mode, in which the forward voltage and the LED current of the LED luminous unit are adapted to an instantaneous value of a supply voltage. An energy storage module of the apparatus provides a storage voltage and supplies the storage voltage to the LED luminous unit. The control device drives the LED luminous unit and the current sink device in a storage operating mode, such that the forward voltage and the LED current of the LED luminous unit are adapted to an instantaneous value of the storage voltage.

13 Claims, 4 Drawing Sheets

(56) References Cited

U.S. PATENT DOCUMENTS

2014/0265897 A1* 9/2014 Taipale .................. H05B 37/02
 315/200 R
2015/0173150 A1* 6/2015 Kim ................... H05B 33/0851
 315/188

FOREIGN PATENT DOCUMENTS

DE 102012006341 A1 10/2013
DE 102012006343 A1 10/2013

* cited by examiner

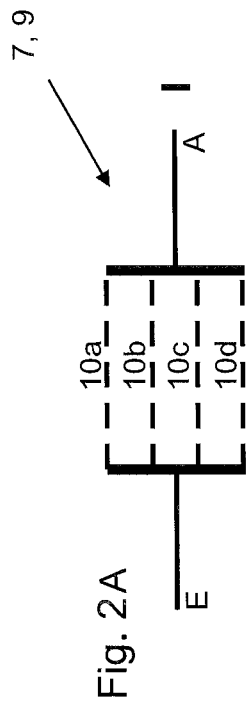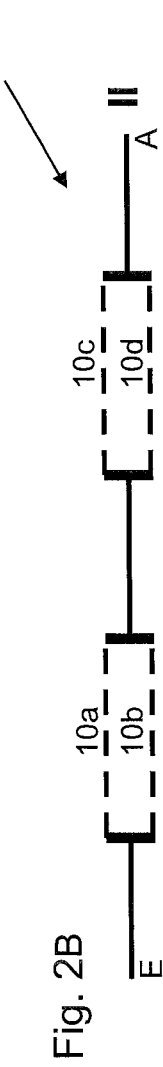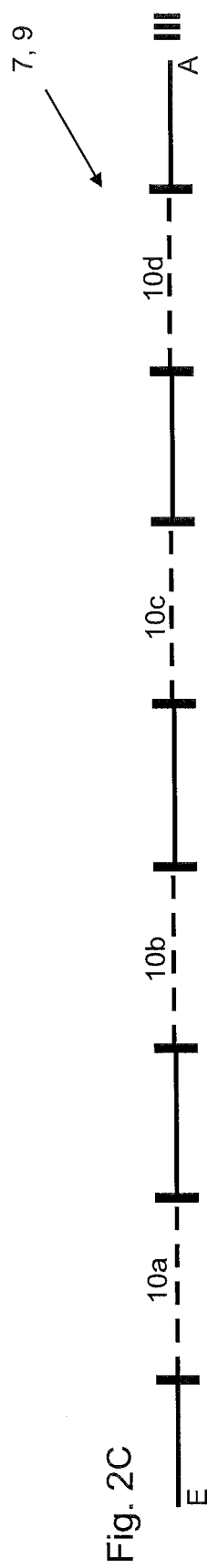
Fig. 2A
Fig. 2B
Fig. 2C

LED LIGHTING APPARATUS COMPRISING AN ENERGY STORAGE MODULE AND METHOD FOR OPERATING THE LED LIGHTING APPARATUS

BACKGROUND OF THE INVENTION

The invention relates to an LED lighting apparatus for an AC voltage supply and to a method for operating the LED lighting apparatus.

DISCUSSION OF THE PRIOR ART

In comparison with thermal illuminants, such as incandescent bulbs, for example, LEDs as illuminants have the advantage of a high luminous efficiency in conjunction with a low energy demand and, as a result thereof, the advantage of low evolution of heat. Consequently, LEDs are an ideal replacement for thermal illuminants in many fields. If consideration is given to the lighting of spaces, in particular of passenger compartments, of means of transportation, such as, for example, aircraft, trains, etc., the small structural space of the LEDs is also afforded as a particularly beneficial advantage alongside the advantages mentioned.

However, the operation of LEDs has the boundary condition that—in contrast to thermal Illuminants—LEDs cannot be operated by AC voltage without an adapting circuit, but rather may only be driven in a very limited DC voltage range. On the one hand, in the case of an LED, a minimum voltage must be exceeded in order to cause the LED to emit light. On the other hand, if an applied voltage is too high, too much current flows through the LED, such that the latter fails after a short time without active cooling. Consequently, the operating window is comparatively narrow in relation to the voltage level for supplying the LED. Consequently, it is not possible to directly connect an LED to an AC voltage supply, since operation of the LED is not possible on account of the greatly changing voltage values.

The documents DE 10 2011 003 931 A1, DE 10 2012 006 315 A1, DE 10 2012 006 316 A1, DE 10 2012 006 341 A1 and DE 10 2012 006 343 A1 describe LED arrangements having in each case a plurality of LEDs, wherein the LEDs can be interconnected with one another flexibly, such that the LEDs in their totality can realize different forward voltages. A rectified AC voltage is fed as supply voltage to these LED arrangements, wherein a control device ensures that the LED arrangement assumes a switching state that corresponds to a present voltage value of the supply voltage. In this way, it is possible to operate the LED arrangement from an AC voltage supply with a rectifier circuit, but without a switched-mode power supply.

SUMMARY OF THE INVENTION

The present invention is based on the object of proposing an LED lighting apparatus for an AC voltage supply which can be operated in a particularly functionally reliable manner.

In the context of the invention, an LED lighting apparatus is proposed which is designed for an AC voltage supply. The AC voltage supply can be, for example, a public electricity mains having a root-mean-square mains voltage of 230 volts and a mains frequency of 50 hertz. Particularly preferably, the AC voltage supply has a root-mean-square voltage of between 100 and 150 volts, in particular 115 volts, and a mains frequency of between 100 hertz and 800 hertz, in particular between 150 hertz and 400 hertz. Particularly preferably, the AC voltage supply is provided in an aircraft. Optionally, the aircraft comprising the AC voltage supply and the LED lighting apparatus forms further subject matter of the invention.

The LED lighting apparatus comprises a rectifier device, which rectifies an AC voltage of the AC voltage supply into a rectified supply voltage with a supply current. The rectifier device can be a bridge circuit, for example. The AC voltage is particularly preferably embodied as a sinusoidal voltage; in alternative embodiments, a distorted sinusoidal voltage or some other alternating AC voltage can also be involved. The supply voltage is particularly preferably embodied as a rectified supply voltage having regularly repeating, preferably sinusoidal, half-cycles and/or as a pulsating DC voltage.

The LED lighting apparatus comprises at least one LED luminous unit; however, a plurality of LED luminous units can also be provided. The, some or all LED luminous units comprise in each case a plurality of LEDs and, either jointly or each individually, a switching arrangement. The LEDs are embodied as light-emitting diodes and can be embodied uniformly white or can emit different colours, in particular red, green and blue as light colours. Overall, the LED luminous unit can emit white light or coloured light, in particular coloured mixed light.

The switching arrangement is designed to interconnect the LEDs in different switching states, wherein the LED luminous unit has different forward voltages in the different switching states. The different forward voltages of the switching states are achieved by the LEDs being connected in series or in parallel with one another depending on the switching state, in order to change the forward voltage. If, for example, two LEDs each having a forward voltage of 3.4 volts are connected in series, then the joint forward voltage is 6.4 volts. If said LEDs are connected in parallel, then the forward voltage is only 3.4 volts. According to this systematization, the LEDs—including in subgroups—can be connected in parallel and in series in order to achieve the different forward voltages. It is optionally supplementarily possible for the switching states to be designed to generate specific mixed colours of the LED luminous unit.

Particularly preferably, the LED luminous unit has at least two, preferably at least three, in particular at least four, different switching states each having different forward voltages of the LED luminous unit. In particular, the LED luminous unit having the switching arrangement is designed in the manner described in the documents DE 10 2012 006 315 A1, DE 10 2012 006 316 A1, DE 10 2012 006 341 A1 and DE 10 2012 006 343 A1 in the name of the present applicant.

The LED lighting apparatus comprises a current sink device, which is designed for controlling the LED current through the LED luminous unit. From a circuitry standpoint, the current sink device is connected in series with the at least one LED luminous unit. The supply voltage, in particular the rectified supply voltage, is present at the series circuit comprising the current sink device and the LED luminous unit. In particular, the current sink device is designed to convert electrical power into heat in order to adapt the LED current.

The LED lighting apparatus additionally comprises a control device, which is designed for driving the LED luminous unit, in particular the switching arrangement of the LED luminous unit, and the current sink device. In a normal operating mode the LED luminous unit and the current sink device are driven such that the forward voltage of the LED luminous unit and the LED current through the LED luminous unit are adapted to an instantaneous value of the supply voltage and/or of the AC voltage and optionally supplementarily to a dimming value for the brightness of the LED luminous unit. The instantaneous value can be a measured instantaneous value or an estimated instantaneous value.

The adaptation of the LED current is effected in such a way that the LED current is set such that the temporal profile of the supply current is synchronized with the temporal profile of the supply voltage and/or with the temporal profile of the AC voltage of the AC voltage supply. The supervision, in particular control or regulation, of the current sink device can make it possible, in particular, to achieve a power factor of greater than 0.98, preferably greater than 0.99, for the LED lighting apparatus.

Furthermore, the control device drives the LED luminous unit, in particular the switching arrangement, such that the forward voltage is adapted to the instantaneous value of the supply voltage, such that the LEDs are operated in their operating window. This is achieved, in particular, by the LED luminous unit, in particular the switching arrangement, being driven at least twice, preferably at least four times, per half-cycle so as to change the switching state and thus the forward voltage. Particularly preferably, a reference variable for the control device is tapped off at the supply voltage and/or at the AC voltage.

In the context of the invention, it is proposed that the LED lighting apparatus comprises an energy storage module, which is electrically connected in parallel with the current sink device and the LED luminous unit, wherein the energy storage module is designed for supplying the at least one LED luminous unit and provides a storage voltage for a storage operating mode. As a result of the circuitry arrangement of the energy storage module, the supply voltage is likewise present at said energy storage module in the normal operating mode, such that the energy storage module can provide, in an energy storage operating mode, a storage voltage which corresponds or at least virtually corresponds to the peak value of the supply voltage. The control device is designed to drive the LED luminous unit and the current sink device in the storage operating mode such that the forward voltage of the LED luminous unit and the LED current through the LED luminous unit are adapted to an instantaneous value of the storage voltage of the energy storage module. Consequently, in the storage operating mode, instead of the supply voltage, the storage voltage of the energy storage module is used for supplying the at least one LED luminous unit and the current sink device and the LED luminous unit, in particular the switching arrangement, are supervised by the control device depending on the storage voltage.

In this case, it is a consideration of the invention that precisely in the case of AC voltage supplies in mobile transportation, in particular in aircraft, mains dropouts can occur, which can be perceived by passengers as flicker of the LED lighting apparatus. Such flicker not only constitutes a disturbance e.g. when reading, but also results in uncertainty for the passengers with regard to the technical reliability of the mobile transportation, in particular of the aircraft. For this reason, it is advantageous to provide the energy storage module, which is designed to bridge such mains dropouts.

However, the bridging of the mains dropouts should not lead to a mode of operation of the LED lighting apparatus, in particular of the LED luminous unit, which is different from that in the normal operating mode. In addition, precisely in the case of energy storage modules having small capacities and/or in the case of relatively long mains dropouts, it should be expected that the storage voltage in the storage operating mode decreases over time, such that lighting inhomogeneities of the LED lighting apparatus can again occur on account of the decreasing storage voltage. Against this background, it is proposed that the control device is designed to drive the LED luminous unit, in particular the switching arrangement, and the current sink device such that operating states adapted to the storage voltage prevail in the storage operating mode as well.

In the preferred configuration of the invention, the control device is designed to drive the LED luminous unit in the storage operating mode in such a way that a switching state having a forward voltage is activated, in particular is always activated, wherein the forward voltage of the chosen switching state is less than or equal to the instantaneous value of the storage voltage. This ensures that the LEDs of the LED luminous unit do not become darker as the storage voltage decreases.

Particularly preferably, it is even provided that the switching state is always activated which has the highest forward voltage which is less than or equal to the instantaneous value of the storage voltage.

While in the normal operating mode, on account of the rapid change in the supply voltage, the switching states are changed in a manner invisible to the human eye, in the storage operating mode it is necessary to take account of the fact that the switching states change so slowly that the change is perceived by the human eye. In order to prevent this perception, it is supplementarily proposed that the control device is designed to drive changing switching states for a constant or quasi-constant instantaneous value of the storage voltage, wherein each of the switching states has a forward voltage which is less than the instantaneous value of the storage voltage. What is achieved by varying the switching states with an identical storage voltage is that different LEDs of the LED lighting apparatus are activated and, consequently, not just the region of LEDs of a single switching state in the LED lighting unit but rather a multiplicity of LEDs and, consequently, wide regions of the LED lighting apparatus are illuminated simultaneously for the human eye. Particularly preferably, the switching states are changed at a frequency of greater than 30 hertz, in particular greater than 60 hertz. This frequency forms a limit for possible detection by the human eye, and so the eye is no longer able to temporally resolve the higher frequencies.

In one preferred development of the invention, the current sink device can be supervised in the storage operating mode in such a way that the LED luminous unit is supplied with an LED current chosen on the basis of a predefined brightness value. The supervision is carried out by means of the control device. What is achieved by means of the development is that the LED current is adapted not just to the instantaneous value of the storage voltage but additionally to a predefinition of a brightness of the LED luminous unit. By way of example, the predefined brightness value can be specified in percent values such as, for example, in ten percent steps with 100%, 90%, etc. The control device is designed to interpret the predefined brightness value and to drive the current sink device correspondingly. The interpretation can be carried out by means of a table, for example, in which all predefined brightness values, the switching states, the storage voltage and the LED current are specified. Alternatively, it is also possible to use an analytical formula or a function for determining the LED current.

Particularly preferably, the predefined brightness values are assigned to different dimming values for the LED luminous unit. In particular, at least 3, preferably at least 5, and especially at least 8, predefined brightness values and/or dimming values can be set.

In one particularly preferred development of the invention, the control device is designed to pick up a brightness status value in the normal operating mode of the LED lighting apparatus and/or of the LED luminous unit. The brightness status value can be embodied as an ACTUAL value or as a SETPOINT value. The pick-up of the brightness status value can be obtained e.g. by a storage of the brightness status value in a memory of the control device. Furthermore, the control device is designed to adapt the predefined brightness value to the brightness status value after the change to the storage operating mode, such that the brightness of the LED lighting apparatus, in particular of the LED luminous unit, is continued preferably in a constant fashion or—if governed by technical dictates—as similarly as possible. This development has the advantage that the brightness of the LED lighting apparatus, in particular of the LED luminous unit, does not change or changes only slightly.

In one preferred configuration of the invention, the energy storage module has an energy store, which is particularly preferably embodied as a storage capacitor. The storage capacitor can have one or a plurality of individual capacitors. The storage capacitor is able to store electrical energy and release it again and is therefore suitable for providing energy for the storage operating mode.

In one preferred realization of the invention, the energy storage module is embodied as a two-terminal network, wherein the two-terminal network is interconnected in parallel with the at least one LED luminous unit and the current sink device. The two-terminal network or the energy storage module with the storage voltage is thus arranged in parallel with the rectified supply voltage.

The charging of the energy storage module proceeds in the normal operating mode of the LED lighting apparatus. Against this background, it is preferred for the energy storage module to have a charging branch, wherein the charging branch has a charging unit and an or the energy store. The energy store is charged by the supply voltage in the normal operating mode. The charging unit can be embodied e.g. as a series circuit formed by a resistor and a diode or a thyristor.

It is furthermore preferred for the energy storage module to have a discharge switching device, wherein the discharge switching device bridges the charging unit and the diode device. Upon the discharge switching device being closed, therefore, the energy store is connected in parallel with the output of the rectifier device and/or with the at least one LED luminous unit and the current sink device in particular with low impedance.

Optionally, it can be provided that a disconnecting switching device is provided, which is designed to disconnect the supply voltage from the LED luminous unit and the current sink device.

In one preferred development of the invention, the LED lighting apparatus comprises a short-circuiting switching device, which is interconnected for bridging the at least one LED luminous unit. The control device is designed to close the short-circuiting device and/or to open the discharge switching device in the storage operating mode in the event of the lowest forward voltage of the LED switching unit falling below the storage voltage. In this way, the energy store is disconnected from the LED luminous unit, such that the LED luminous unit is deactivated in the event of falling below the minimum forward voltage.

Further subject matter of the invention is a method for operating the LED lighting apparatus of the kind described above or according to any of the preceding claims, wherein in a normal operating mode the control device drives the LED luminous unit and the current sink device such that the forward voltage of the LED luminous unit and the LED current through the LED luminous unit are adapted to an instantaneous value of the supply voltage and/or of the AC voltage, and in a storage operating mode the forward voltage of the LED luminous unit and the LED current through the LED luminous unit are adapted to an instantaneous value of the storage voltage.

BRIEF DESCRIPTION OF THE DRAWINGS

Further features, advantages and effects of the invention are evident from the following description of a preferred exemplary embodiment of the invention and from the accompanying figures, in which:

FIGS. 2A, 2B, 2C show a schematic block diagram of the LED switching unit 7 as a detail of the LED lighting apparatus in FIG. 1;

DETAILED DESCRIPTION OF THE INVENTION

Figure 1:
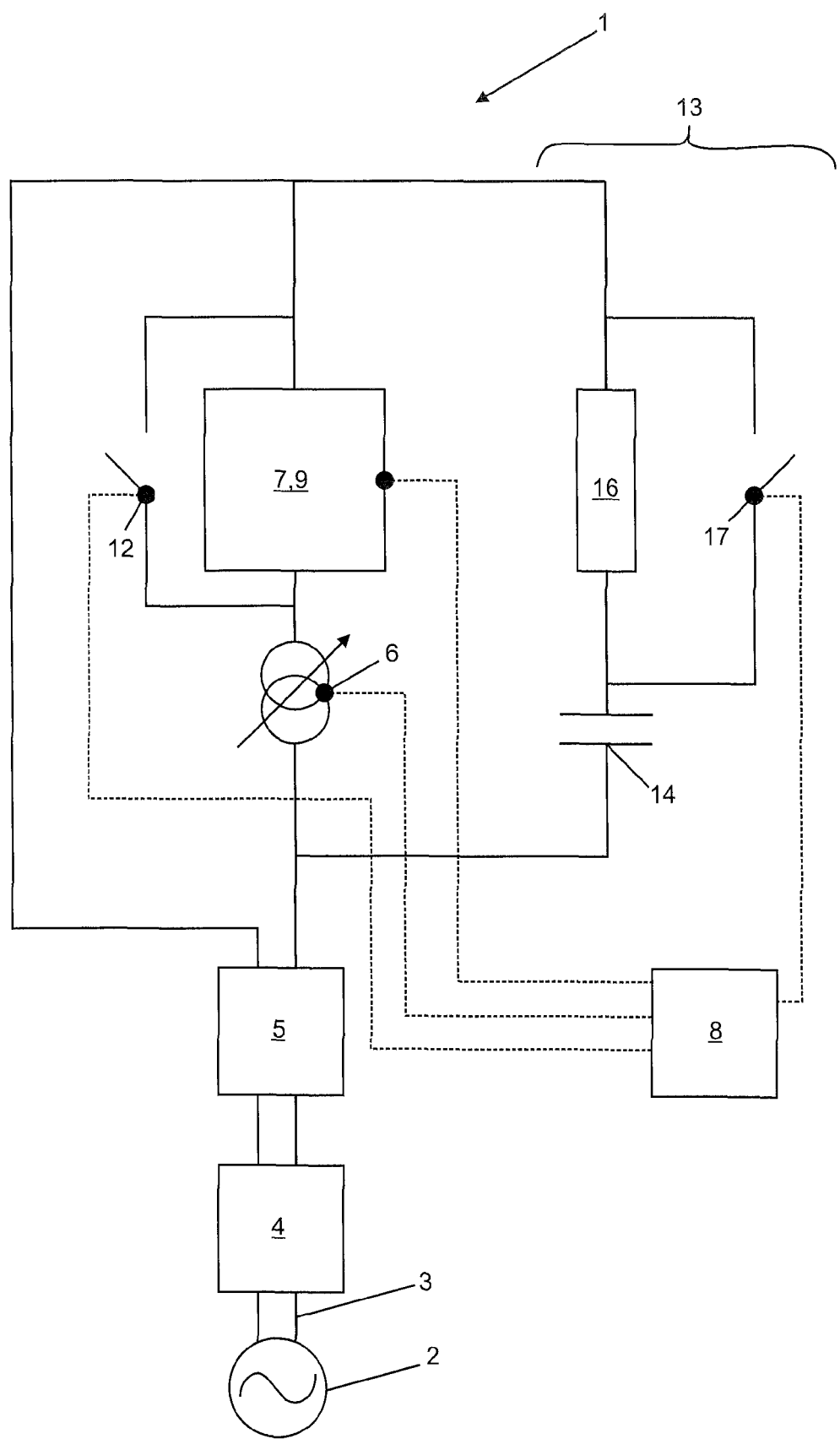
FIG. 1 shows a schematic block diagram of an LED lighting apparatus as an exemplary embodiment of the invention.

FIG. 1 shows in a schematic block diagram an LED lighting apparatus 1, which can be arranged or is arranged in an aircraft as passenger compartment lighting, as a first exemplary embodiment of the invention. The aircraft provides an AC voltage supply 2 having an AC voltage. The root-mean-square voltage of the AC voltage is 115 volts, for example; the frequency of the AC voltage supply is between 150 hertz and 400 hertz.

Downstream of a connection interface 3 there optionally follows a mains filter 4 designed to filter disturbances which might be coupled back into the AC voltage supply 2.

A rectifier 5 is connected downstream of the mains filter 4, said rectifier being designed to convert the applied AC voltage or the filtered AC voltage into a rectified supply voltage. The rectifier 5 is embodied as a bridge rectifier, for example. The supply voltage is embodied as a pulsating DC voltage having half-cycles, in particular having twice the frequency of the AC voltage supply 2. By way of example, the supply voltage is formed by a juxtaposition of sinusoidal half-cycles having twice the frequency of the AC voltage supply.

The supply voltage provided by the rectifier 5 or the corresponding supply current is subsequently forwarded to a current sink device 6—also called electronic load. The current sink device 6 is designed, in a regulated or controlled manner, to draw current and thus power from the circuit by conversion into heat. Proceeding from the current sink device 6, an LED voltage and an LED current are transferred to an LED luminous unit 7 having a plurality of LEDs.

The LED lighting apparatus 1 additionally comprises a control device 8, which can be embodied integrally as shown here or alternatively in a multipartite fashion and which is designed at least for driving the LED luminous unit 7 and the current sink device 6. The control device 8 can be embodied as a programmable microcontroller, for example.

As an input signal, the control device 8 receives the supply voltage or the AC voltage or a signal equivalent thereto. The LED luminous unit 7 can be switched in different switching states by means of the control device 8, in order to be able to react to different amplitudes of the supply voltage.

FIG. 2A shows the LED luminous unit 7 having a switching arrangement 9 in a highly schematic illustration. The LED luminous unit 7 comprises an input E and an output A, or a first and a second terminal, via which the LED luminous unit 7 is connected to the voltage supply illustrated in FIG. 1.

In this example, the LED luminous unit 7 comprises four LED subgroups 10a, b, c, d, wherein each LED subgroup 10a, b, c, d has at least one LED. In particular, each LED subgroup 10a, b, c, d has the same forward voltage. As illustrated symbolically in FIGS. 2A, 2B, 2C, the LEDs in the LED subgroups 10a, b, c, d can be connected in series with one another in each of the LED subgroups 10a, b, c, d. In modified exemplary embodiments, the LEDs in the LED subgroups 10a, b, c, d can also be interconnected in parallel, in series or in a manner mixed in parallel and in series with one another. In this exemplary embodiment, each LED subgroup 10a, b, c, d has the same forward voltage. In the first switching state I of the LED luminous unit 7 as shown in FIG. 2A, the four LED subgroups 10a, b, c, d are arranged electrically in parallel with one another, such that the forward voltage of the LED luminous unit 7 corresponds to the forward voltage of one of the LED subgroups 10a, b, c, d.

FIG. 2B illustrates a second switching state II, wherein the LED subgroups 10a, b, c, d in the LED luminous unit 7 are connected only partly electrically in series with one another. By way of example, it is provided that in the first group the LED subgroups 10a, b are arranged in parallel with one another and in the second group the LED subgroups 10c, d are likewise arranged in parallel with one another, but the two groups are arranged in series with one another. In the switching state II the forward voltage of the LED luminous unit 7 now corresponds to twice the forward voltage of one of the LED subgroups 10a, b, c, d.

FIG. 2C illustrates a third switching state III, wherein now all four LED subgroups 10a, b, c, d are arranged electrically in series with one another. The forward voltage of the LED luminous unit 7 now corresponds to four times the forward voltage of one of the LED subgroups 10a, b, c, d.

The switching arrangement 9 is designed to switch the LED luminous unit 7 into the different switching states I, II, III. A corresponding switching arrangement 9 for this type of changeover can be realized for example with the aid of diodes and transistors.

The manner of changeover to different switching states is not limited to the example described, however, but rather can also be achieved by other switching arrangements, such as, for example, the LED lighting apparatuses mentioned in the introduction. It is also possible for the LED subgroups 10a, b, c, d to be deactivated in the switching states. Moreover, it is possible for a mixed light to be generated by LED subgroups having different colours.

Figure 3:
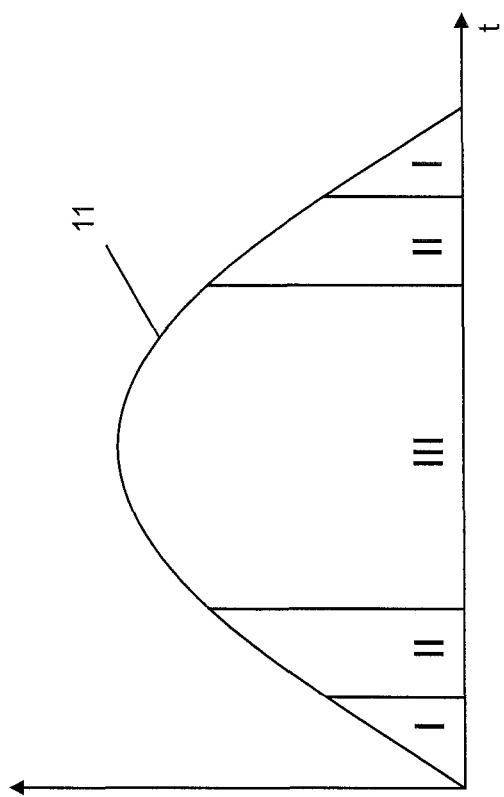
FIG. 3 shows a schematic diagram of the voltage profile of a half-cycle of the supply voltage for elucidating the driving of the switching states in the normal operating mode of the LED lighting apparatus in FIG. 1.

FIG. 3 reveals highly schematically a half-cycle of the supply voltage 11, the illustration showing that the switching states I, II, III are always chosen such that the forward voltage is less than an instantaneous value of the supply voltage 11. On the other hand, the LED luminous unit 7 is always set to the switching state which has the maximum forward voltage, in order to minimize power losses.

The LED lighting apparatus 1 additionally comprises a short-circuiting switching device 12 for bridging the LED luminous unit 7, wherein the short-circuiting switching device 12 is activated if the instantaneous value of the supply voltage 11 is less than the forward voltage of the switching state having the minimum forward voltage. The short-circuiting switching device 12 is thus activated at the start and at the end of the half-cycle.

Without further measures, the LED current and, as a result thereof, the supply current and ultimately the mains current, on account of the changeover processes in the LED luminous unit 7, would lead to a mains current profile characterized by inhomogeneities and spikes. In order, however, to achieve a high power factor of greater than 0.99, the control device 8 drives the current sink device 6 in such a way that the supply current and thus the mains current progresses synchronously with the supply voltage or synchronously with the AC voltage or mains voltage. In particular, in the normal operating mode with a closed short-circuiting switching device 12 the current sink device 6 is driven to convert current and thus power into heat, in order to keep the power factor high.

The LED lighting apparatus 1 additionally comprises an energy storage module 13, which is electrically connected in parallel with the current sink device 6 and the LED luminous unit 7. The energy storage module 13 has an energy store 14 and a charging unit 16. In a normal operating mode, if an AC voltage from the AC voltage supply 2 is present via the connection interface 3, the energy store 14 is charged via the charging unit 16. The charging unit 16 can be embodied e.g. as a series circuit formed by a resistor and a diode.

A discharge switching device 17 is arranged electrically in parallel with the charging unit 16, said discharge switching device being embodied as a bypass via the charging unit 16. For the case where the AC voltage supply 2 fails, the discharge switching device 17 is closed and the energy store 14 with a storage voltage forms the energy supply for the LED luminous unit 7. The changeover of the discharge switching device 17 is controlled by the control device 8. An uninterruptible voltage supply is thus provided for the LED lighting apparatus 1.

Figure 4:
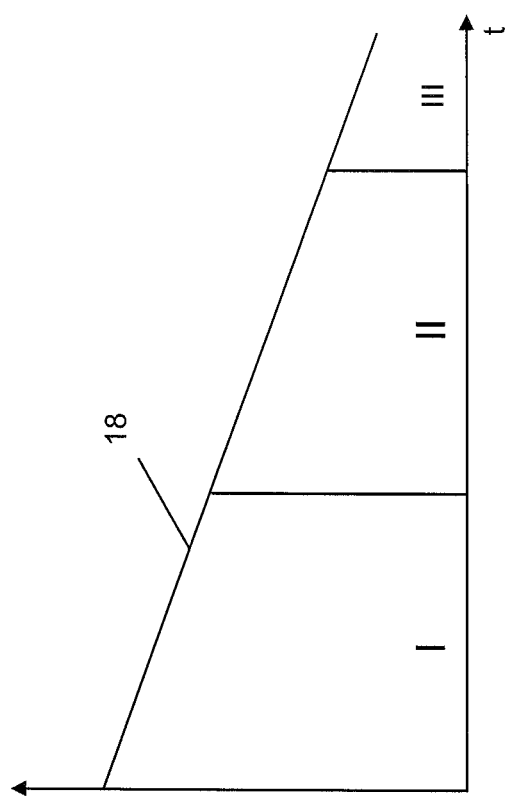
FIG. 4 shows a schematic diagram of the voltage profile of the storage voltage for elucidating the driving of the switching states in the storage operating mode of the LED lighting apparatus in FIG. 1.

In the case of a small energy store 14 or relatively long failure times of the AC voltage supply 2, it should be expected that the storage voltage 18 of the energy storage module 13 decreases over time. For this reason, the control device 8 is designed to adapt the switching states I, II, III to the instantaneous value of the storage voltage 18, as is illustrated in FIG. 4. In this Regard—in a manner similar to that in the case of supply with the AC voltage supply—the switching state is chosen which is less than the instantaneous value of the storage voltage that has the highest forward voltage.

As soon as the storage voltage falls to a voltage value which is less than the lowest forward voltage in all switching states, the short-circuiting switching device 12 is closed and the discharge switching device 17 is additionally opened in order to prevent the LEDs in the LED switching unit 7 from glowing.

In a dimming operating mode of the LED lighting apparatus 1, the current sink device 6 can be driven by the control device 8 such that the LED current is reduced in order to dim the LEDs of the LED luminous unit 7. This function is used e.g. for darkening a passenger cabin. By way of example, it is possible to increase a resistance value in the current sink device 6 in order to limit the LED current. The dimming value in the normal operating mode can be expressed for example in percent with respect to a maximum brightness, that is to say for example 100%, 90%, 80%, etc. In this case, the percentages indicated can relate to the power consumed by the LED luminous unit 7 or can be related to arbitrary units. The dimming values thus define a brightness status value of the LED lighting apparatus 1 in the normal operating mode. In this case, the brightness status value can be an actual variable of the brightness, for example a measured variable, or a set-point variable, thus a control value.

The control device 8 is designed to store or to retain the brightness status value from the normal operating mode, such that said value is available in the event of a change from the normal operating mode to the storage operating mode. Moreover, the control device 8 is designed to adapt the predefined brightness value, that is to say a dimming value for the storage operating mode, to the brightness status value in the storage operating mode, such that the brightness of the LED lighting apparatus 1 is continued. Particularly preferably, the brightness is continued in a constant fashion, but technical dictates may govern that the brightness be tracked as identically as possible. The adaptation of the brightness to the predefined brightness value in the storage operating mode is effected by the driving of the current sink device 6. What is thus achieved by means of the transfer of the brightness status value is that the dimming of the LED lighting apparatus 1 remains constant in the event of a change between the normal operating mode and the storage operating mode. Optionally supplementarily it can be provided that a brightness status value in the storage operating mode or the brightness status value continues to be stored or retained when the LED lighting apparatus 1 is changed over from the storage operating mode to the normal operating mode, such that the LED lighting apparatus 1 is driven in accordance with the brightness status value in the normal operating mode.

In the storage operating mode, provision can be made for forming a plurality of switching states having the same forward voltages, wherein the switching states having the same forward voltages are driven alternately as variations in order to avoid selective illumination of individual driven LEDs of the LED switching unit 7. The changes in switching states are preferred effected at a frequency of greater than 30 hertz in order to make them appear invisible to the human eye.

For the case where the storage voltage 18 falls below the lowest forward voltage of the different switching states I, II, III, the discharge switching device 17, and optionally supplementarily the short-circuiting switching device 12, is closed in order that the energy store 14 is not completely discharged.

LIST OF REFERENCE SIGNS

1 LED lighting apparatus
2 AC voltage supply
3 connection interface
4 mains filter
5 rectifier
6 current sink device
7 LED luminous unit
8 control device
9 switching arrangement
10a, b, c, d LED subgroups
11 supply voltage
12 short-circuiting switching device
13 energy storage module
14 energy store
16 charging unit
17 discharge switching device
18 storage voltage
A output
E input

What is claimed is:

1. An LED lighting apparatus for an AC voltage supply, the apparatus comprising:
    a rectifier device for generating a rectified supply voltage from an AC voltage of the AC voltage supply,
    at least one LED luminous unit, wherein the LED luminous unit comprises a plurality of LEDs and a switching arrangement, wherein the switching arrangement is adapted to interconnect the LEDs into different switching states, wherein the LED luminous unit has different forward voltages in the different switching states,
    a current sink device for controlling the LED current through the LED luminous unit, wherein the current sink device is connected in series with the at least one LED luminous unit, and wherein the supply voltage is present at the current sink device in series with the luminous unit,
    a control device for driving the LED luminous unit and the current sink device in a normal operating mode, such that the forward voltage of the LED luminous unit and the LED current through the LED luminous unit are adapted to at least one of an instantaneous value of the supply voltage and an instantaneous value of the AC voltage, and
    an energy storage module, which is electrically connected in parallel with the current sink device and the LED luminous unit, wherein the energy storage module provides a storage voltage and is adapted to supply the storage voltage to the at least one LED luminous unit, and wherein the control device is adapted to drive the LED luminous unit and the current sink device in a storage operating mode such that the forward voltage of the LED luminous unit and the LED current through the LED luminous unit are adapted to an instantaneous value of the storage voltage of the energy storage module.

2. The LED lighting apparatus according to claim 1, wherein in the storage operating mode, the control device drives the LED luminous unit such that a switching state having a forward voltage is activated, wherein the forward voltage is less than or equal to the instantaneous value of the storage voltage.

3. The LED lighting apparatus according to claim 2, wherein the switching state, which has the highest forward voltage, is activated, wherein the highest forward voltage is less than or equal to the instantaneous value of the storage voltage.

4. The LED lighting apparatus according to claim 1, wherein in the storage operating mode, the control device is adapted to change switching states having an identical forward voltage, with respect to a value of the storage voltage.

5. The LED lighting apparatus according to claim 1, wherein the control device is adapted to drive the current sink device in the storage operating mode such that the LED luminous unit is supplied with an LED current in accordance with a predefined brightness value.

6. The LED lighting apparatus according to claim 5, wherein the predefined brightness value assumes a plurality of different dimming values.

7. The LED lighting apparatus according to claim 5, wherein the control device is adapted to pick up a brightness status value in the normal operating mode and to adapt the predefined brightness value to the brightness status value after the change to the storage operating mode, such that the brightness of the LED lighting apparatus is continued.

8. The LED lighting apparatus according to claim 1, wherein the energy storage module comprises an energy store.

9. The LED lighting apparatus according to claim 1, wherein the energy storage module comprises a two-terminal network interconnected in parallel with the at least one LED luminous unit and the current sink device.

10. The LED lighting apparatus according to claim 1, wherein the energy storage module comprises a charging branch, wherein the charging branch comprises at least one of a charging unit and an energy store, such that the energy store is chargeable by the supply voltage in the normal operating mode.

11. The LED lighting apparatus according to claim 10, wherein the energy storage module comprises a discharge switching device, wherein the discharge switching device bridges the charging unit.

12. The LED lighting apparatus according to claim 1, further comprising a short-circuiting device for bridging the at least one LED luminous unit, wherein the control device is adapted to close the short-circuiting device and/or to open the discharge switching device in the storage operating mode in the event of the lowest forward voltage of the LED luminous unit falling below the storage voltage.

13. A method for operating the LED lighting apparatus according to claim 1,
   wherein in the normal operating mode, the control device drives the LED luminous unit and the current sink device such that the forward voltage of the LED luminous unit and the LED current through the LED luminous unit are adapted to at least one of an instantaneous value of the supply voltage and an instantaneous value of the AC voltage, and
   wherein in a storage operating mode, the forward voltage of the LED luminous unit and the LED current through the LED luminous unit are adapted to an instantaneous value of the storage voltage.

\* \* \* \* \*